(12) United States Patent
Cheng

(10) Patent No.: US 7,324,154 B2
(45) Date of Patent: Jan. 29, 2008

(54) MONITORING VIDEO CAMERA

(76) Inventor: Yi-Jen Cheng, 9F, No. 21, Sec. 2, Chorngder 2 Rd., Taichung (TW)

( * ) Notice: Subject to any disclaimer, the term of this patent is extended or adjusted under 35 U.S.C. 154(b) by 612 days.

(21) Appl. No.: 10/994,673

(22) Filed: Nov. 23, 2004

(65) Prior Publication Data

US 2006/0109374 A1 May 25, 2006

(51) Int. Cl.
*H04N 5/225* (2006.01)
(52) U.S. Cl. ............... 348/373; 396/427; 396/535
(58) Field of Classification Search ............... 348/373; 396/28, 427, 535; 248/580, 565, 571
See application file for complete search history.

(56) References Cited

U.S. PATENT DOCUMENTS

| | | | |
|---|---|---|---|
| 4,833,534 A * | 5/1989 | Paff et al. ............... | 348/151 |
| 5,121,215 A * | 6/1992 | Boers et al. ............ | 348/373 |
| 5,701,015 A * | 12/1997 | Lungershausen et al. | 250/495.1 |
| 6,392,704 B1 * | 5/2002 | Garcia-Ortiz ........... | 348/373 |
| 6,824,317 B2 * | 11/2004 | Finizio et al. ........... | 396/427 |
| 2003/0093805 A1 * | 5/2003 | Gin ......................... | 725/105 |
| 2003/0174865 A1 * | 9/2003 | Vernon .................... | 382/105 |

* cited by examiner

*Primary Examiner*—David Ometz
*Assistant Examiner*—Wanda M. Negrón
(74) *Attorney, Agent, or Firm*—Posz Law Group, PLC; R. Eugene Varndell, Jr.

(57) ABSTRACT

A monitoring video camera has a mounting bracket, a lens assembly, a light assembly and a transparent shell. The mounting bracket has a bottom surface. The lens assembly is mounted on the bottom surface of the mounting bracket and has a primary bracket and a lens. The primary bracket is rotatably mounted on the mounting bracket. The lens is mounted on the bracket. The light assembly is mounted on the primary bracket and has multiple springs, a light control PCB and a lens shade sleeve. The springs are connected between the light control PCB and the primary bracket. The light control PCB has multiple LEDs. The springs maintain a tight contact between the inner surface of the transparent shell and the bottom surface of the lens shade sleeve to prevent over-exposure.

6 Claims, 4 Drawing Sheets

MONITORING VIDEO CAMERA

BACKGROUND OF THE INVENTION

1. Field of the Invention

The present invention relates to a video camera, and more particularly to a monitor video camera that can operate in low visibility environments and during the night.

2. Description of Related Art

Monitoring video cameras are used generally in places such as banks or laboratories that have valuable properties such as cash, experiment instruments or computer hardware and documents, to record the actions of people in these places and prevent the unauthorized accesses to these valuable properties.

With reference to FIG. 3, a conventional monitor video camera is mounted on a ceiling and comprises a mounting bracket (50), two side tabs (51), a camera bracket (52), two printed circuit boards (PCBs) (54), a lens (53) and a transparent shell (55).

The mounting bracket (50) is mounted on the ceiling and has a bottom surface and a bottom outer edge.

The side tabs (51) are mounted on the bottom surface of the mounting bracket (50), are separate from each other and each side tab (51) has a distal end and a curved slot (510). The curved slot (510) is defined through the side tab (51) and close to the distal end.

The camera bracket (52) is mounted slidably and rotatably between the side tabs (51) and has two opposite sides and two sliding pins (520). The sliding pins (520) are mounted securely on the sides of the camera bracket (52) and extend slidably and rotatably through the curved slots in the side tabs (51).

The PCBs (54) are mounted through the camera bracket (52).

The lens (53) is mounted on the camera bracket (52) and is connected electrically to the PCBs (54).

The transparent shell (55) is mounted on the bottom outer edge of the mounting bracket (50) and covers the elements (51, 52, 53, 54).

However, the conventional monitoring video camera must be used in light and bright places or in daylight.

With reference to FIG. 4, an improved monitoring video camera is used in both dark and light places and comprises a mounting bracket (60), two side tabs (61), a stationary bar (62), a camera bracket (63), two camera control PCBs (64), a lens bracket (65), a lens (66), a light control PCB (67), a lens shade sleeve (68) and a transparent shell (69).

The mounting bracket (60) is mounted on a ceiling and has a bottom surface and a bottom outer edge.

The side tabs (61) are mounted on the bottom surface of the mounting bracket (60) and are separate from each other.

The stationary bar (62) is mounted on the bottom surface of the mounting bracket (60) and has a distal end and a protrusion formed on the distal end.

The camera bracket (63) is mounted rotatably between the side tabs (61) and has a sector top edge, multiple teeth (630) and a bottom surface. The teeth (630) are formed along the sector top edge of the camera bracket (60) and adjacent two of the teeth (630) engage with the protrusion on the stationary bar (62).

The camera control PCBs (64) are mounted on the bottom surface of the camera bracket (63), are located respectively on an upper position and a lower position and each camera control PCB (64) has a bottom surface.

The lens bracket (65) is mounted on the bottom surface of the lower camera control PCB (64) and has a bottom.

The lens (66) is mounted on the bottom of the lens bracket (65).

The light control PCB (67) is mounted around the lens bracket (65) and has a bottom surface and multiple light emitting diodes (LEDs) (671). The LEDs (671) are mounted on the bottom surface of the light control PCB (67) and are arranged circularly around the lens (66).

The lens shade sleeve (68) is made of foam rubber, is mounted between the LEDs (671) and the lens (66) and has a bottom end opposite to the bottom of the light control PCB (67).

The transparent shell (69) is mounted on the bottom outer edge of the mounting bracket (69) and has an inner surface abutting the bottom end of the lens shade sleeve (68).

When the improved monitoring video camera operates, the LEDs (67) illuminate surrounding environment so the monitoring video camera can take clear dynamic or static images. The lens shade sleeve (68) prevents light of excessive intensity from the LEDs (67) passing into the lens (67) as that excessive light would cause over-exposure of the negative.

However, the improved monitoring video camera has several disadvantages as follows:

1. The stationary bar (62) and the teeth (630) make the monitoring video camera expensive.
2. The sector top edge of the camera bracket (63) and the PCBs (64, 67) cause the volume of the improved monitoring video camera to be larger than that of the conventional monitoring video camera.
3. The lens shade sleeve (68) hardens and deforms after a period of time due to the high temperature of the LEDs (671) and loses its resilience so the bottom end of the lens shade sleeve (68) cannot abut the inner surface of the transparent shell (69) and causes excessive gaps between the lens shade sleeve (68) and the transparent shell (69) whereby over-exposure may be caused by stray light from the LEDs (671). To overcome the shortcomings, the present invention provides a monitoring video camera to mitigate or obviate the aforementioned problems.

SUMMARY OF THE INVENTION

The main objective of the invention is to provide a monitoring video camera that operates both in day light and low visibility and has no problem of over-exposure.

A monitoring video camera in accordance with the present invention comprises a mounting bracket, a lens assembly, a light assembly and a transparent shell.

The mounting bracket has a bottom surface. The lens assembly is mounted on the bottom surface of the mounting bracket and has a primary bracket and a lens. The primary bracket is rotatably mounted on the mounting bracket. The lens is mounted on the bracket. The light assembly is mounted on the primary bracket and has multiple springs, a light control PCB and a lens shade sleeve. The springs are connected between the light control PCB and the primary bracket.

Other objectives, advantages and novel features of the invention will become more apparent from the following detailed description when taken in conjunction with the accompanying drawings.

DETAILED DESCRIPTION OF PREFERRED EMBODIMENT

Figure 1:
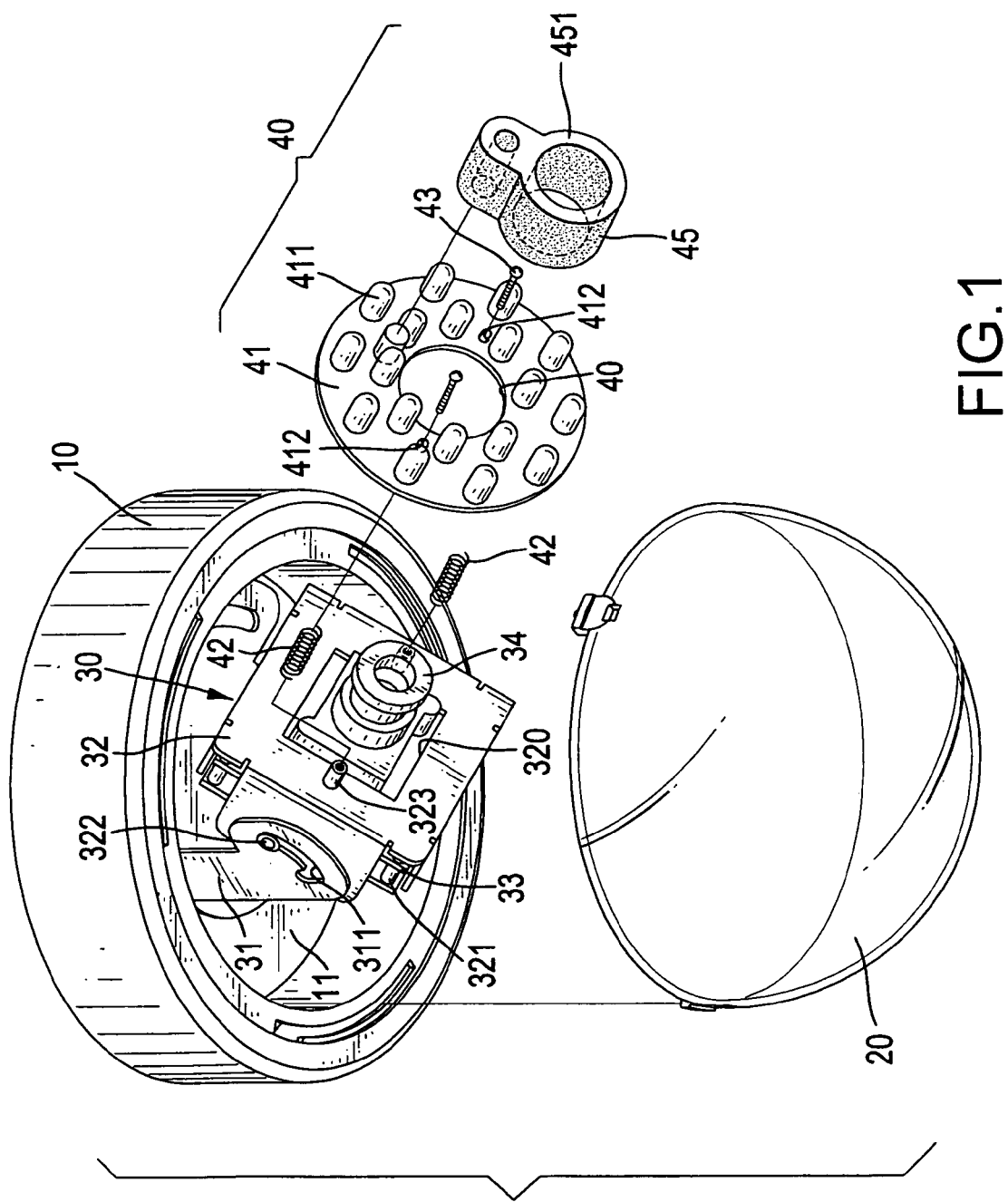
FIG. 1 is a perspective exploded view of a monitoring video camera in accordance with the present invention.
Figure 2:
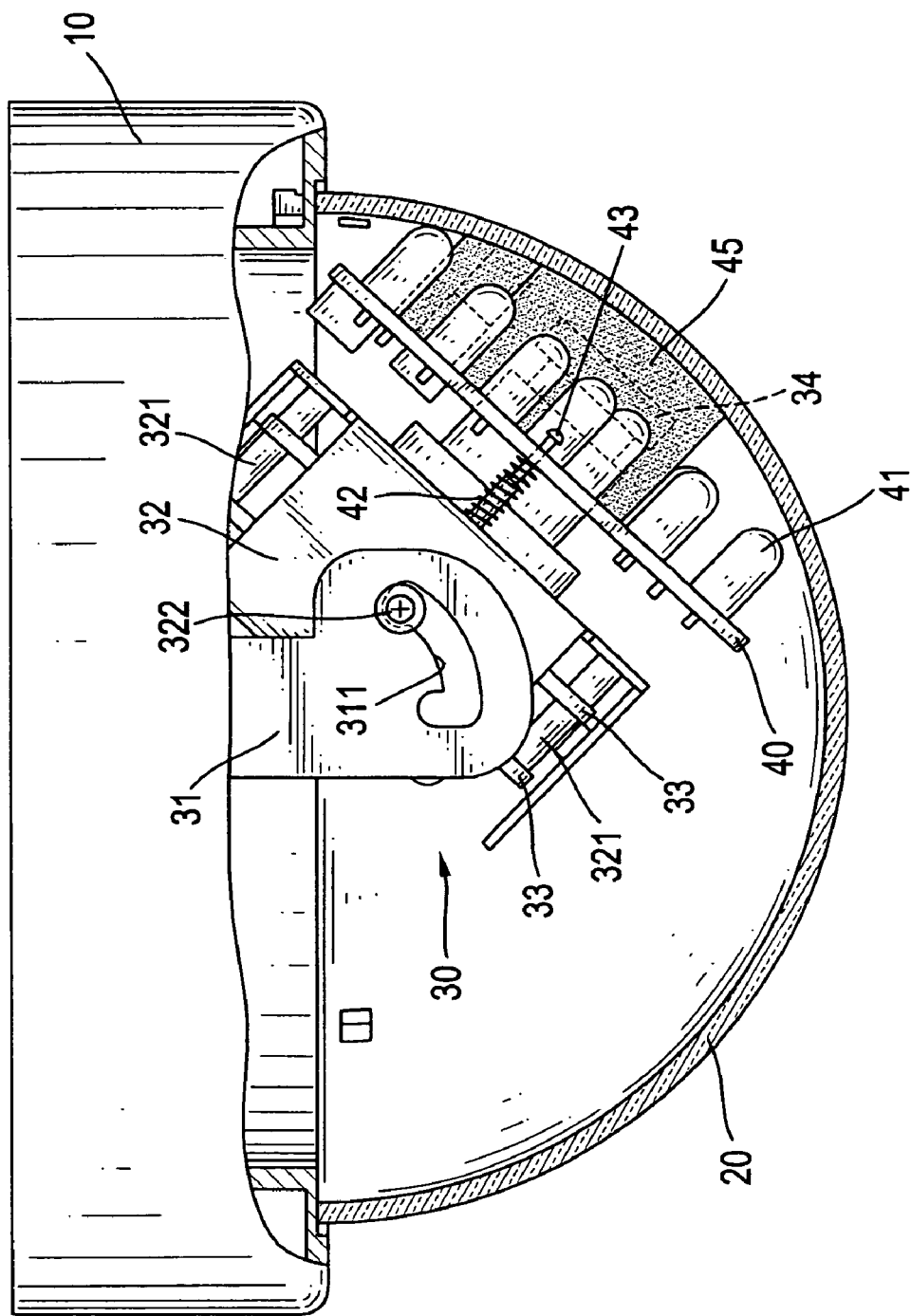
FIG. 2 is a side view in partial cross section of the monitoring video camera in FIG. 1.
Figure 3:
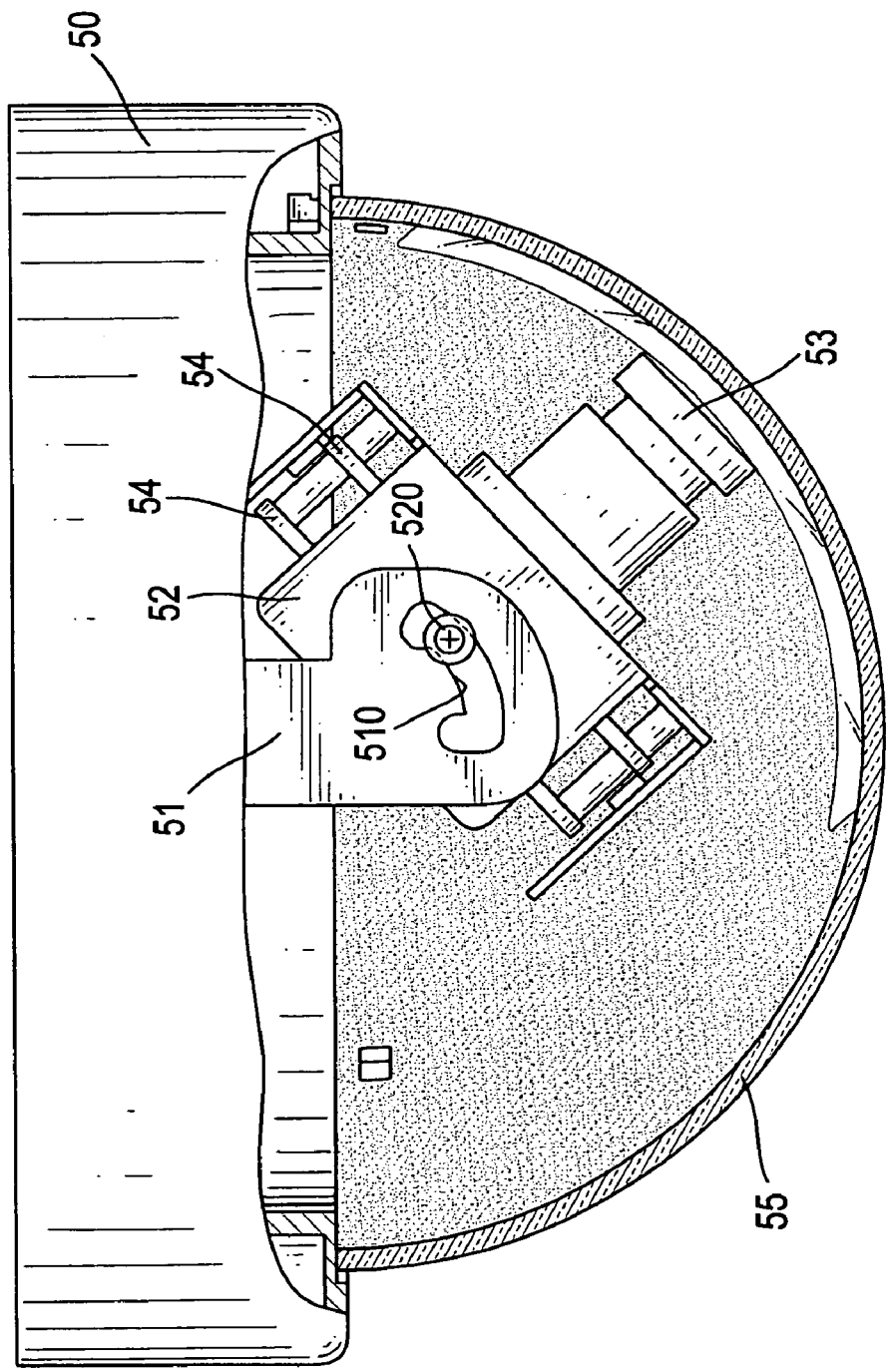
FIG. 3 is a side view in partial cross section of a monitoring video camera in accordance with the prior art.
Figure 4:
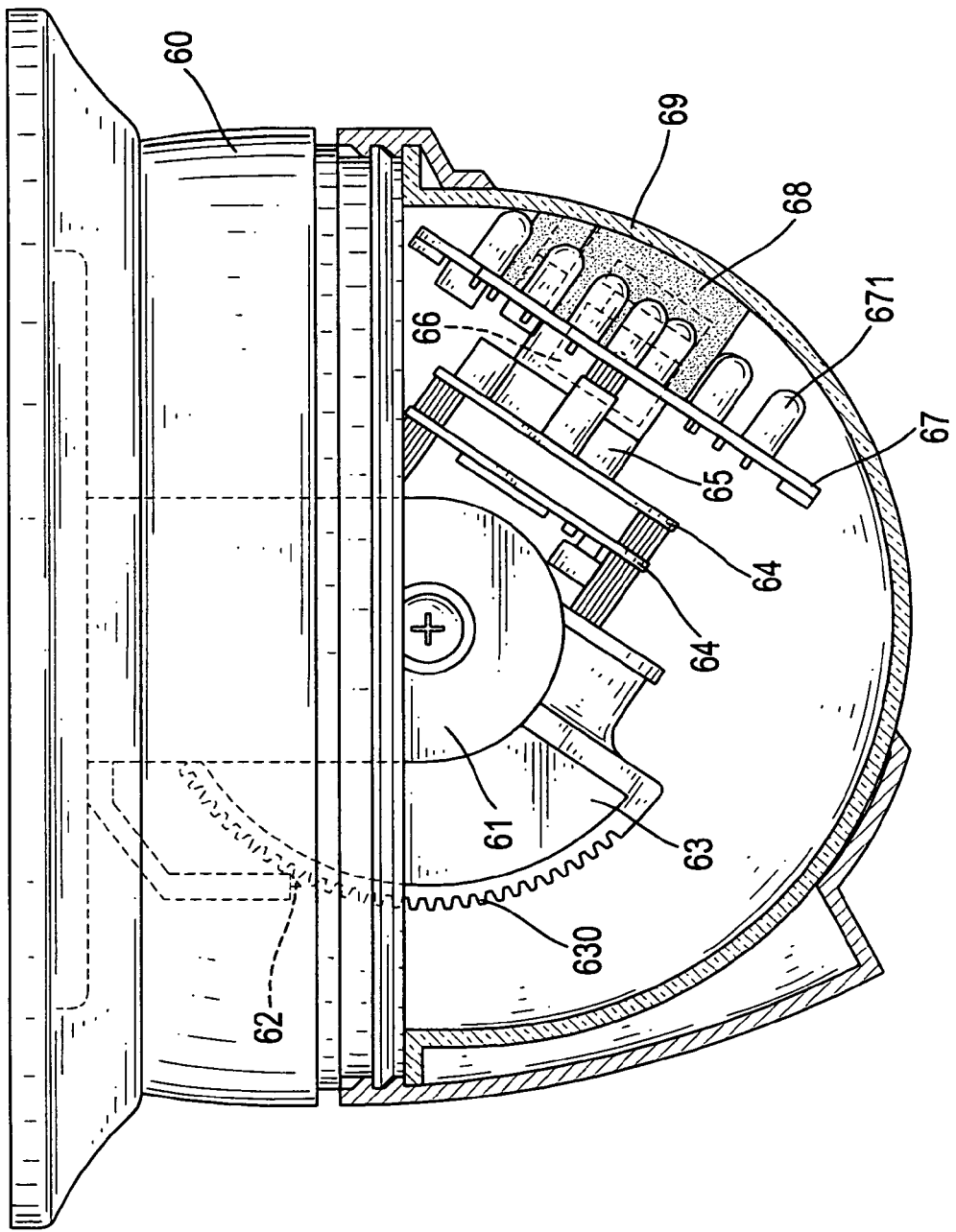
FIG. 4 is a side view in partial cross section of an improved monitoring video camera in accordance with the prior art.

With reference to FIG. 1, a monitoring video camera in accordance with the present invention is mounted on a ceiling and comprises a mounting bracket (10), a lens assembly (30), a light assembly (40) and a transparent shell (20).

The mounting bracket (10) is mounted on the ceiling and has a bottom surface (11).

The lens assembly (30) is mounted on the bottom surface (11) of the mounting bracket (10) and has two side tabs (31), a primary bracket (32), two camera control printed circuit boards (PCBs) (33) and a lens (34).

The side tabs (31) are mounted on the bottom surface (11), are separate from each other, and each has a distal end and a curved slot (311) defined through the side tab (31) and close to the distal end.

The primary bracket (32) is mounted rotatably and slidably between the side tabs (31) and has a mounting panel, four perpendicular sidewalls and two sliding pins (322). The mounting panel is located between the side tabs (31) and has a top surface, a bottom surface, an outer edge, a through hole (320), multiple mounting sleeves (323) and multiple mounting posts (321). The through hole (320) is defined through the mounting panel. The mounting sleeves (323) are formed on the bottom surface of the mounting panel and each mounting sleeve (323) has an open bottom end and an inner threaded surface. The mounting posts (321) are mounted securely on the top surface of the mounting panel. Preferably, the quantity of the mounting sleeves (323) is two.

The perpendicular sidewalls are formed on the outer edge of the mounting panel and respectively have an inside surface and an outside surface. Two of the perpendicular sidewalls are opposite to each other and respectively adjacent to the side tabs (31).

The two sliding pins (322) are mounted securely on the outside surfaces of the opposite two perpendicular sidewalls and extend respectively, rotatably and slidably through the curved slots (311).

The camera control PCBs (33), mounted on the mounting posts (321), are surrounded by the perpendicular sidewalls inside the primary bracket (32). Each camera control PCB (33) has a bottom surface. One of the camera control PCBs (33) is close to the mounting panel.

The lens (34) is mounted securely on the bottom surface of the camera control PCB (33), is close to the mounting panel and extends through the through hole (320) in the mounting panel.

The light assembly (40) is mounted around the lens (34), is connected to the mounting panel of the primary bracket (32) and has multiple springs (42), an annular light control PCB (41), multiple bolts (43), and a lens shade sleeve (45).

The springs (42) correspond to and are mounted respectively around the mounting sleeves (323) and each spring (42) has a bottom end. Preferably, the quantity of the springs (42) is two.

The annular light control PCB (41) is mounted around the lens (34), abuts the springs (42) and has a top surface, a bottom surface, a central hole (410), multiple slots (412) and multiple light emitting diodes (LEDs) (411). The top surface of the annular light control PCB (41) abuts the bottom end of the springs (42). The central hole (410) is defined through the annular light control PCB (41) and allows the lens (34) to extend through the central hole (410). The slots (412) are defined through the annular light control PCB (41) and correspond to the mounting sleeves (323). Preferably, the quantity of the slots (412) is two. The LEDs (411) are mounted on the bottom surface of the annular light control PCB (41) and around the lens (34).

The multiple bolts (43) correspond to the mounting sleeves (323) of the primary bracket (32), respectively extend through the slots (412) of the annular light control PCB (41) and the springs (42) and are screwed respectively into the open bottom end of the mounting sleeves (323). The bolts (43) function as a track to allow the light control PCB (41) to slide along the bolts (43).

The lens shade sleeve (45) is made of resilient material such as foam rubber, is mounted on the bottom surface of the annular light control PCB (41), is located between the lens (34) and LEDs (411) and around the lens (34) and has a bottom surface and a smooth coating (451). The smooth coating is made of polypropylene (PP) and is attached to the bottom surface of the lens shade sleeve (45).

The transparent shell (20) is mounted detachably on the bottom surface (11) and covers the lens assembly (30) and the light assembly (40) and has an inner surface. The inner surface of the transparent shell (20) abuts the bottom surface of the lens shade sleeve (45).

The springs (42) between the mounting bracket (42) and the light control PCB (41) press the light control PCB (41) with restoring forces so that the bottom surface with the smooth coating (451) of the lens shade sleeve (45) tightly contacts the inner surface of the transparent shell (20). When the lens shade sleeve (45) hardens and deforms after a period of time, the springs (42) still maintain the tight contact between the inner surface of the transparent shell (20) and the bottom surface of the lens shade sleeve (451). Thus, any light of the LEDs (411) reflected by the inner surface of the transparent shell (20) does not pass into the lens (34) and does not cause over-exposure.

Furthermore, the camera control PCBs (33) are mounted inside the mounting bracket (32) and do not occupy extra space so that the monitoring video camera in accordance with the present invention is especially compact.

In addition, the smooth coating (451) reduces the friction between the inner surface of the transparent shell (20) and the bottom surface of the lens shade sleeve (45) when the lens (34) and light assembly (30, 40) rotate in the transparent shell (20).

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A monitoring video camera comprising:
a mounting bracket having a bottom surface;
a lens assembly mounted on the bottom surface of the mounting bracket and having two side tabs mounted on the bottom surface and separate from each other, and each side tab and having a distal end and a curved slot defined through the side tab and close to the distal end;

a primary bracket mounted rotatably and slidably between the side tabs and having a mounting panel located between the side tabs and having a top surface;

a bottom surface;

an outer edge;

a through hole defined through the mounting panel;

multiple mounting sleeves formed on the bottom surface of the mounting panel and each mounting sleeve having an open bottom end and an inner threaded surface; and multiple mounting posts mounted securely on the top surface of the mounting panel;

four perpendicular sidewalls formed on the outer edge of the mounting panel, respectively having an inside surface and an outside surface, wherein two of the perpendicular sidewalls are opposite to each other and respectively adjacent to the side tabs; and;

two sliding pins mounted securely on the outside surfaces of the opposite two perpendicular sidewalls and extending respectively, rotatably and slidably through the curved slots;

two camera control printed circuit boards (PCBs) mounted on the mounting posts, surrounded by the perpendicular sidewalls inside the primary bracket, respectively having a bottom surface, wherein one of the camera control PCBs is close to the mounting panel; and a lens mounted securely on the bottom surface of the camera control PCB, close to the mounting panel and extending through the through hole in the mounting panel;

a light assembly mounted around the lens, connected to the mounting panel of the primary bracket and having multiple springs corresponding to and mounted respectively around the mounting sleeves and each spring having a bottom end;

an annular light control PCB mounted around the lens, abutting the springs and having a top surface abutting the bottom end of the springs;

a bottom surface;

a central hole defined through the annular light control PCB and allowing the lens to extend through the central hole;

multiple slots defined through the annular light control PCB and corresponding to the mounting sleeves; and multiple light emitting diodes (LEDs) mounted on the bottom surface of the annular light control PCB and around the lens;

multiple bolts corresponding to the mounting sleeves of the primary bracket, respectively extending through the slots of the annular light control PCB and the springs and screwed respectively into the open bottom end of the mounting sleeves; and a lens shade sleeve made of resilient material, mounted on the bottom surface of the annular light control PCB, located between the lens and LEDs and around the lens and having an bottom surface; and a transparent shell mounted detachably on the bottom surface and covering the lens assembly and the light assembly and having an inner surface abutting the bottom surface of the lens shade sleeve.

2. The monitoring video camera as claimed in claim 1, wherein the lens shade sleeve further has a smooth coating made of polypropylene (PP) and attached to the bottom surface of the lens shade sleeve.

3. The monitoring video camera as claimed in claim 2, wherein a quantity of the mounting sleeves is two, a quantity of the springs is two, and a quantity of the slots is two.

4. The monitoring video camera as claimed in claim 1, wherein the lens shade sleeve is made of foam rubber.

5. The monitoring video camera as claimed in claim 2, wherein the lens shade sleeve is made of foam rubber.

6. The monitoring video camera as claimed in claim 3, wherein the lens shade sleeve is made of foam rubber.

* * * * *